W. H. HOLZINGER.
AUTOMOBILE SPRING.
APPLICATION FILED JAN. 4, 1918.
1,333,806.
Patented Mar. 16, 1920.
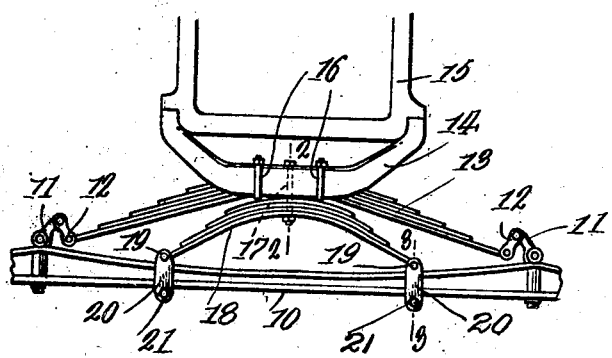
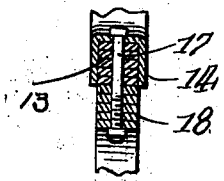 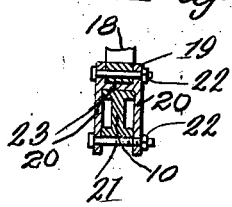
INVENTOR
William H. Holzinger
WITNESSES
BY
ATTORNEY

UNITED STATES PATENT OFFICE.

WILLIAM H. HOLZINGER, OF ANNAWAN, ILLINOIS.

AUTOMOBILE-SPRING.

1,333,806.　　　　　Specification of Letters Patent.　　Patented Mar. 16, 1920.

Application filed January 4, 1918. Serial No. 210,317.

*To all whom it may concern:*

Be it known that I, WILLIAM H. HOLZINGER, a citizen of the United States, residing at Annawan, in the county of Henry and State of Illinois, have invented certain new and useful Improvements in Automobile-Springs, of which the following is a specification.

This invention has relation to vehicle springs, and the primary object thereof is to provide a spring designed especially for association with the front spring of motor vehicles, of the Ford type, to reinforce said spring.

Another object of the invention is to provide an auxiliary spring for attachment to the front axle of motor vehicles of the Ford type when these vehicles are converted into commercial vehicles or when the vehicle, when used as a pleasure car, is subjected to continual rough usage.

A still further object of the invention is to provide an auxiliary spring for the front axle of motor vehicles of the Ford type to relieve strain upon the spring forming a part of this equipment of the vehicle, to prevent breakage thereof, and to generally improve the riding of the vehicle.

A still further object of the invention is to provide means for securing my improved auxiliary spring to the front axle of a motor vehicle whereby to insure the correct operation of the spring to take up the rebound of the spring forming a part of the regular equipment of the vehicle, and to reduce the side sway of the vehicle body.

In addition to the foregoing my invention comprehends improvements in the details of construction and arrangement of the correlative parts to be hereinafter more fully described and particularly set forth in the appended claim.

In the accompanying drawings in which similar and corresponding parts are designated by the same characters of reference throughout the several views in which they appear:

Figure 1, is a fragmentary view in front elevation illustrating the embodiment of my auxiliary frame in the front axle, vehicle springs and appurtenant parts of a motor vehicle of the Ford type.

Fig. 2, is a vertical section taken on the line 2—2 of the preceding figure, and Fig. 3, is a similar view taken on the line 3—3 thereof.

With reference to the drawings 10 indicates the axle provided adjacent its end with studs 11 for pivotally supporting the shackle 12. The shackle serves to support the terminals of an arched spring 13 usually provided in a vehicle of the Ford type, the intermediate portion of which spring is inclosed within the yoke 14 supporting the radiator 15. U-bolts 16 are embraced about the intermediate portion of the yoke and serve to assist in holding the spring 13 in place. A bolt 17 is also extended through an opening formed centrally of the spring 13 through the yoke.

The bolt 17, for the purpose of incorporating my auxiliary spring in the vehicle, is removed, and another substituted in lieu thereof which is approximately twice the length. My auxiliary spring is indicated at 18, and is formed of laminations varying in length, and is moreover arched. The intermediate portion is perforated to receive the bolt 17, the auxiliary spring engaging the under side of the spring 13 and lying in the same vertical plane. The terminals of the auxiliary spring 18 are connected to bolts 19 which extend through the upper apertured terminals of a pair of plates 20. There are four of these plates, two on each side of the axle, and their lower ends are connected by bolts 21 which rigidly connect the terminals of the auxiliary spring to the axle. By properly adjusting the bolts 19 and 21 by means of nuts 22 applied to the terminals thereof, the terminals of the auxiliary spring may be rigidly held against side swaying.

Thus it will be seen that I have provided an auxiliary spring, which by reason of its location beneath the spring serves as a reinforcing means to prevent undue deflection of the spring 13. When pleasure cars are converted into commercial vehicles, the springs are subjected to extraordinary strain. It is therefore my object to provide an auxiliary spring for the springs usually provided for the vehicle, to prevent the rebound, and to prevent undue deflection of the regular spring. It will be noted that since the terminals of the auxiliary spring are rigidly connected to the axle, the side sway of the vehicle, which occurs owing to the shackle 12 by which the terminals of the regular spring are connected to the axle, is materially reduced, or entirely prevented. The plates 20 forming the means for securing the terminals of the auxiliary spring to the axle may be connected by means of a connecting bar 23 if desired. This construction is clearly shown in Fig. 3.

While I have illustrated and described my invention with some degree of particularity, I realize that in practice various alterations may be made, and I therefore desire to reserve the right and privilege of changing the form of the details of construction, or otherwise altering the arrangement of the correlative parts, without departing from the spirit of the invention or the scope of the appended claim.

Having thus described my invention what I claim as new and desire to secure by Letters Patent is:—

In a motor vehicle, a body, an axle, a spring connected to the axle and supporting the body, U-bolts connecting the spring to the body, an auxiliary spring mounted between the first-mentioned spring and axle, a bolt for securing the auxiliary spring to the first-mentioned spring, plates on each side of the axle and at each end of the auxiliary spring and having a connecting bar intermediate their ends adapted to rest on top of the axle, bolts passing through the plates adjacent the upper ends and extending through the ends of the auxiliary spring for rigidly connecting the ends to the axle, and bolts passing through the plates adjacent the lower end and engaging the underside of the axle.

In testimony whereof I affix my signature in presence of two witnesses.

WILLIAM H. HOLZINGER.

Witnesses:
ELLA G. HOLZINGER,
W. H. HOLZINGER, Sr.